Patented Dec. 24, 1940

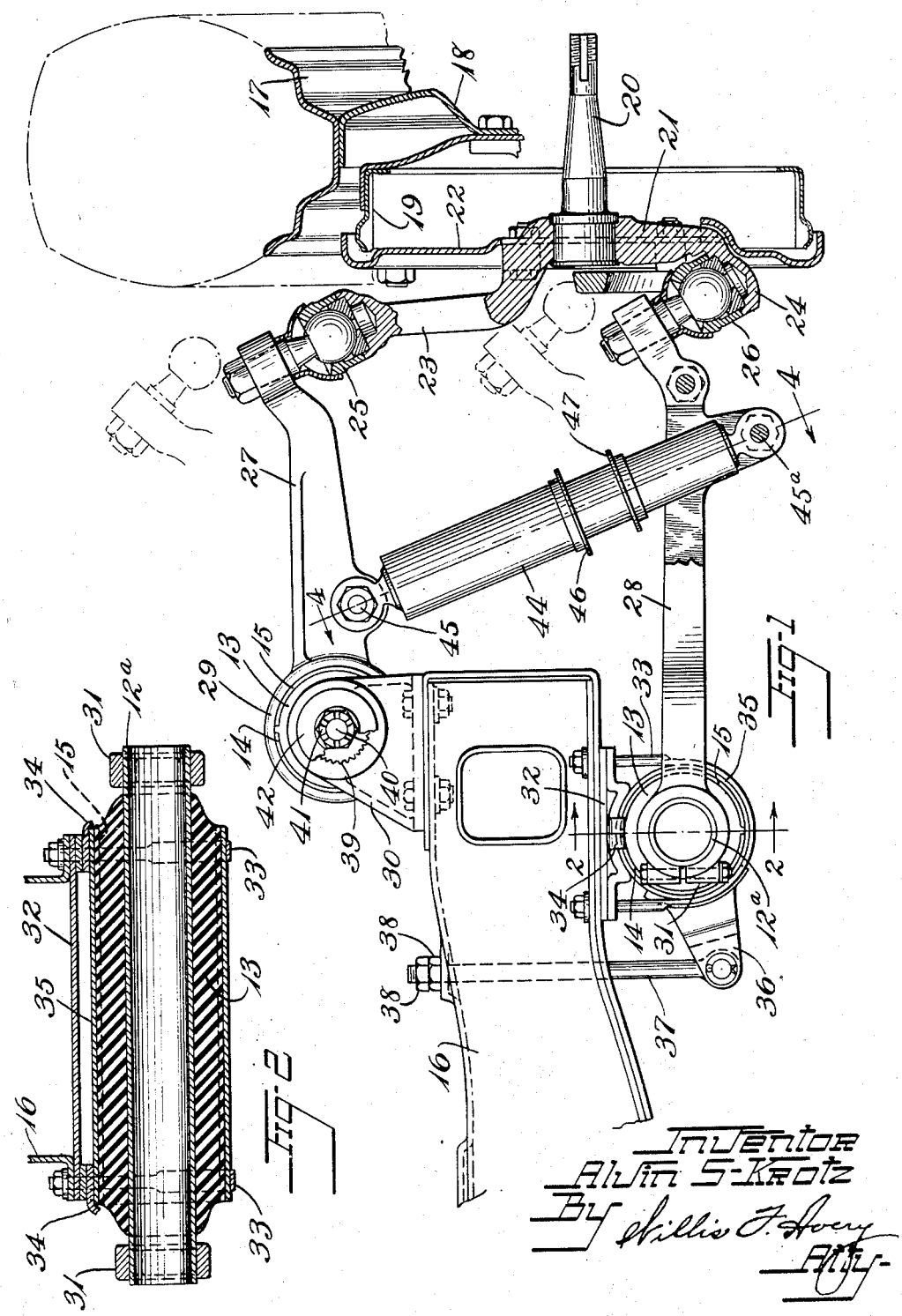

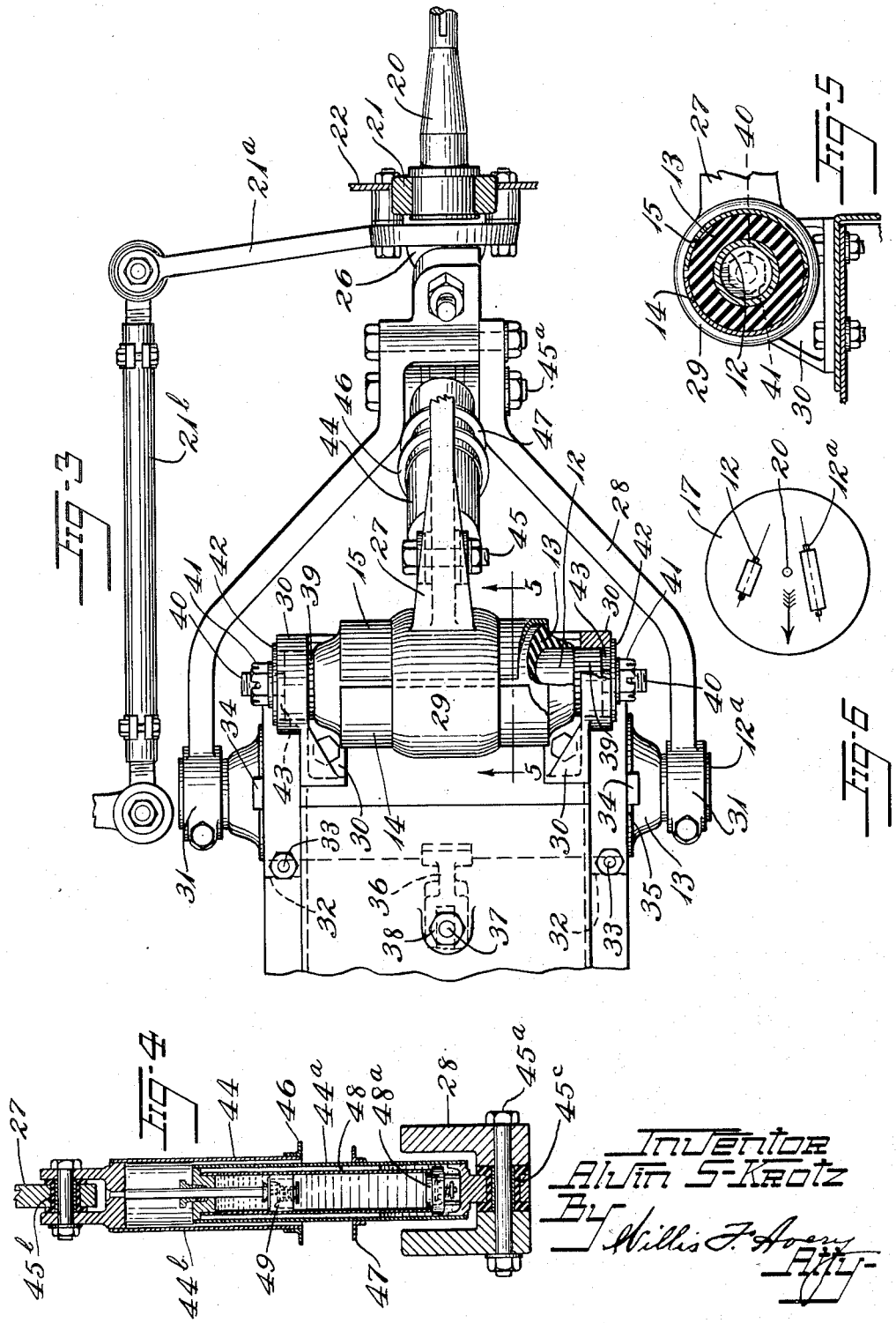

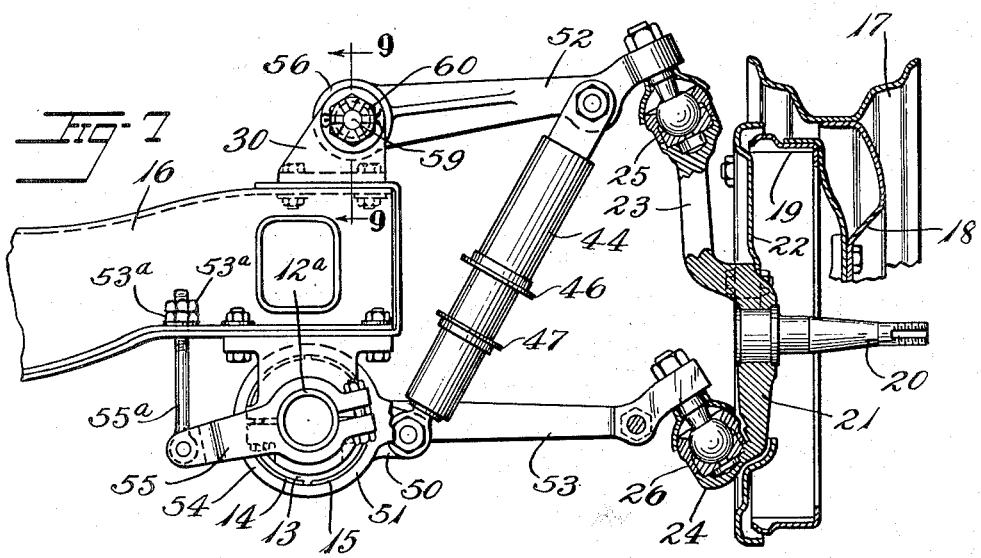
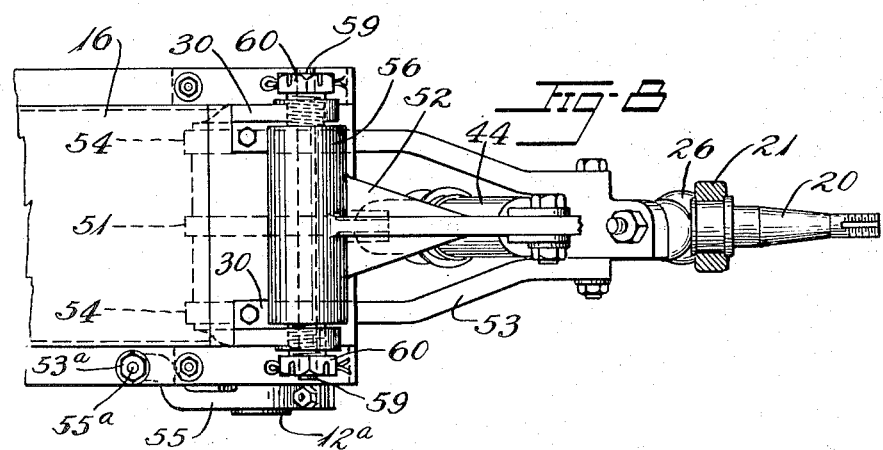
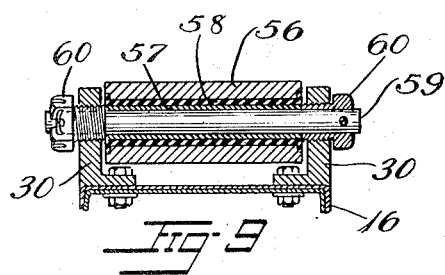

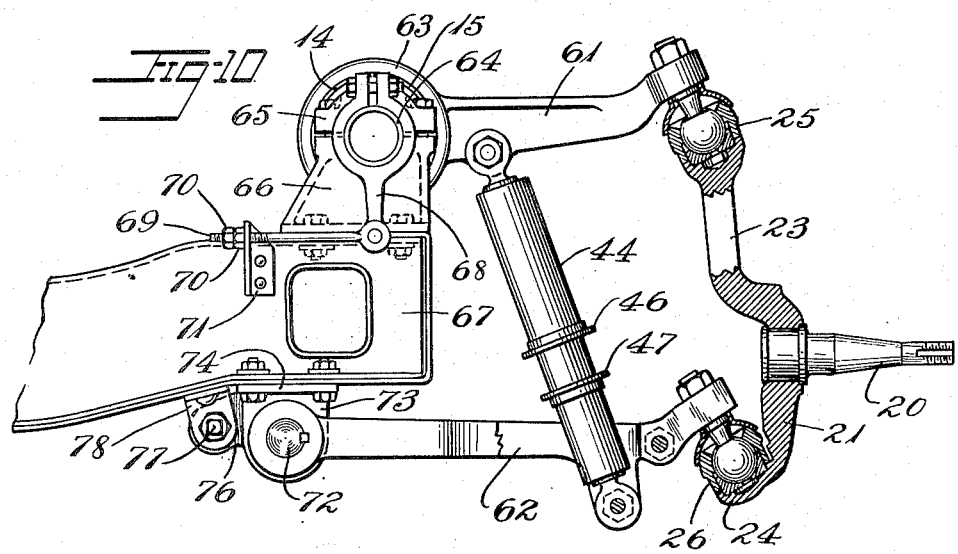
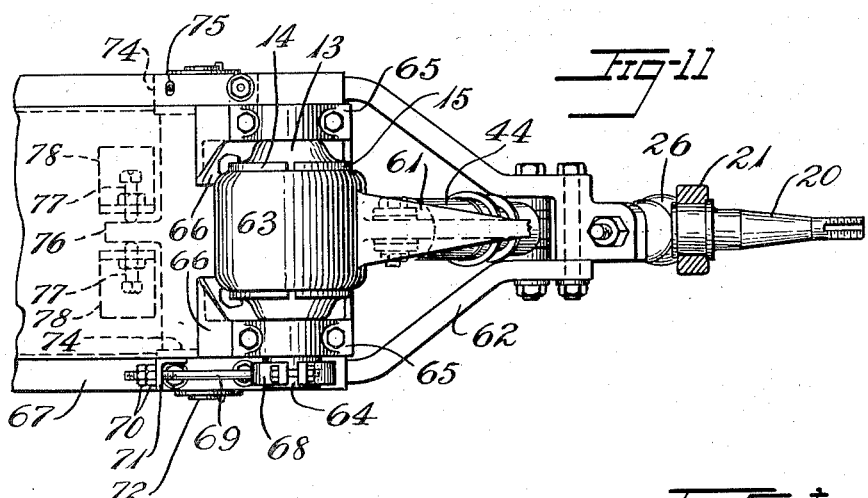

2,226,406

UNITED STATES PATENT OFFICE 2,226,406

VEHICLE WHEEL MOUNTING

Alvin S. Krotz, Akron, Ohio, assignor to The B. F. Goodrich Company, New York, N. Y., a corporation of New York Application November 18, 1936, Serial No. 111,424

18 Claims. (Cl. 267—21)

This invention relates to vehicle wheel mountings, and especially to wheel mountings of the independent wheel suspension type. The invention in some of its phases is useful especially in wheel mountings adapted for a steering movement of the wheel, but many of the features are applicable to wheel mountings generally.

The chief objects of the invention are to provide an improved mounting wherein the supported load is transmitted to the wheel through one or more rubber bushings by torsional stress of the rubber, to provide improved riding qualities of the vehicle, to provide for conveniently and effectively adjusting parts of the assembly for various purposes; to provide for effectively absorbing and cushioning shock and to provide an improved mounting in which the supported structure is completely insulated from the wheel assembly by rubber bushings.

These and further objects will be apparent from the following description, reference being had to the accompanying drawings in which:

Fig. 1 is a front elevation of a wheel mounting constructed according to and embodying the invention, parts being sectioned and broken away.

Fig. 2 is a section taken along the line 2—2 of Fig. 1.

Fig. 3 is a plan view of the mounting of Fig. 1, parts being sectioned and broken away.

Fig. 4 is a section taken along the line 4—4 of Fig. 1.

Fig. 5 is a section taken along the line 5—5 of Fig. 3.

Fig. 6 is a diagrammatic view in side elevation of a portion of the assembly of Figs. 1 and 3, showing a modified arrangement.

Fig. 7 is a front elevation like Fig. 1 but showing a modified construction.

Fig. 8 is a plan view of the mounting of Fig. 7, parts being broken away and sectioned.

Fig. 9 is a section taken along the line 9—9 of Fig. 7.

Fig. 10 is a front elevation like that of Fig. 1 but showing a modified construction.

Fig. 11 is a plan view of the mounting of Fig. 10, parts being broken away and sectioned.

The improved wheel mounting of the invention includes one or more bushings of rubber arranged for resiliently transmitting supported loads to the wheel assembly by torsional stress of the rubber. Preferably the rubber bushings are of a construction including an inner shaft element 12, or 12a, an annular body of rubber 13 upon the shaft element, and an enclosing sleeve structure, desirably circumferentially discontinuous, so that the bushing may be held within an enclosing structure with the sleeve structure and rubber held pressed toward the inner shaft element, the rubber being thereby held radially compressed. Preferably the rubber is adhered, as by vulcanization, both to the inner shaft element and to the sleeve structure, the latter of which may be provided as a plurality of sections 14 and 15. The same numerals are used for like parts in the several views of the drawings.

Referring to the embodiment of Figs. 1 to 5, in the construction illustrated the vehicle comprises a transverse frame element 16 at the end of which is mounted a wheel assembly comprising a rim 17 having a web 18 and brake drum 19, all of which are rotatably mounted upon a wheel spindle 20. The wheel spindle 20 is rigid with a knuckle forging 21 and a brake spider 22. A suitable linkage 21a, 21b is provided for steering. The knuckle forging 21 comprises upper and lower arms 23 and 24 at the ends of which are provided ball joints 25 and 26, the arrangement being such that the wheel has a steering movement about an axis through these pivotal joints. As shown in Fig. 1 this axis is canted somewhat, as viewed from the front, to provide the conventional king-pin angle. The ball heads of the ball joints 25 and 26 are mounted at the outer extremities of upper and lower link members 27 and 28, the latter preferably being of wish-bone shape as shown. The upper link member 27 has at its inner end an eye 29 for holding one of the rubber bushings under radial compression, causing the link member 27 to turn with the outer sleeve structure 14—15 of the bushing. The shaft element of the bushing is mounted in trunnions 30, 30 secured to the frame element 16.

The lower link member 28 has the ends of its wish-bone arms clamped at 31, 31 upon the ends of the shaft element 12a of another rubber bushing. This bushing may be mounted at the lower face of frame element 16 as by a bracket structure 32 to which the bushing is held, as by axially spaced apart straps 33, 33. For retaining the bushing against endwise movement in its mounting the bracket 32 may be provided with depending lugs 34, 34 engaging the ends of the outer sleeve structure of the bushing. If desired, an auxiliary tube or sleeve 35 may be provided for enclosing the radially-compressed bushing so that the sleeve sections 14—15 need not be of heavy material.

Preferably an independent adjustment for each bushing is provided for the purpose of preloading the rubber bushing in torsion so that the deflected position of the frame element 16 with relation to the wheel assembly under load may be conveniently varied. For this purpose the outer sleeve 35 of the lower bushing has an arm 36 secured rigidly thereto, as by welding, and at the projecting end of the arm an adjusting rod 37 is pivoted, the rod passing through an opening in the frame element 16 and being held thereto as by means of adjusting nuts 38, 38. By this construction the outer sleeve of the bushing may be rotatably adjusted upon loosening the straps 33, 33 so that the relative rotative positions of the shaft element 12a and the link 28 with respect to the frame element may be varied to adjust the relative positions vertically of the wheel assembly and body structure. This adjustment may be made conveniently after the vehicle leaves the manufacturing plant.

The upper bushing preferably has an adjustment for a similar purpose but of a different construction, adapted for adjustment in the factory but not necessarily for use in the field. For this purpose end portions of the shaft element 12 are formed with longitudinally extending serrations 39, 39 adapted for axially sliding engagement with a set of similar serrations in the trunnions 30, 30, and for holding the bushing in the trunnions against axial movement the ends of the shaft element 12 are formed with end studs 40, 40 having threaded portions for lock nuts 41, 41, washers 42, 42 being provided between the lock nuts and the trunnions 30, 30.

It is preferred to provide for axial adjustment of at least one of the bushings for the purpose of adjusting the caster angle which is the angle of the axis through the steering pivots 25, 26, with respect to the vertical when the assembly is viewed from the side, and for this purpose the ends of the shaft element 12 are formed to provide inner spaces 43, 43 permitting the bushing to be adjusted axially while the shaft element is held against rotation by teeth 39, 39 and to be held in the adjusted position by the lock nuts 41, 41. Axial shifting of the bushing causes a corresponding shifting fore and aft of the upper link 27 and accordingly the pivot 25 is adjusted in the fore and aft direction for varying the caster angle.

For the purpose of avoiding certain objectionable effects of braking and other forces upon steering action it is desirable that the upper and lower links have a slight yielding movement fore and aft of the vehicle, swinging about generally vertical axes through the rubber bushings. By providing so that this yielding movement of the link members is rotative about the wheel axis in the proper degree any tendency of the wheel to swing by movement of the wheel in horizontal translation about its steering axis under force such as may be caused by braking may be substantially nullified. As shown in Fig. 1, for example, the upper link is shorter than the lower link, and therefore permits a smaller fore and aft linear movement at its outer end for a given angular movement than is permitted for the link member by the rubber bushing at its inner end. Also, as shown, the upper pivot 25 is disposed at a somewhat greater distance from the axis of spindle 20 than the distance from that axis to the lower pivot 26. These dimensional factors are provided chiefly for clearance reasons. Because of the presence of these factors it is desirable to provide an arrangement whereby the upper link member 27 has a somewhat freer action than the lower link member in swinging slightly about a generally vertical axis through its rubber bushing. In the preferred embodiment this freer movement of the upper link member is effected by providing the upper bushing of less axial length than the lower bushing as shown in Fig. 3, so that it has somewhat less resistance than the lower bushing to fore and aft swinging of its link member. Variations may be made in the lengths of the upper and lower links, the heights of their outer joints above the ground-contacting portion of the tire and the resistances of the bushings in the fore and aft swinging movements of the link members. To realize the advantages referred to these factors are correlated in accordance with mechanical laws so that the forces of brake reaction will not tend to cause fore and aft translation of the wheel spindle but rather a rotative movement of the wheel about the spindle. These results are made possible by the flexible nature of the construction described herein, in contrast to the rigid nature of mountings proposed heretofore, especially in respect to the fore and aft swinging movement of the link members that is permitted under the resilient control of the rubber bushings of the present construction. The ability of the link members to yield resiliently in the fore and aft direction of the vehicle is useful also in cushioning wheel shocks in the directions to cause such yielding.

For the purpose of providing an arrangement whereby the forces of deceleration on the wheel assembly may be utilized for developing an upward force to counteract the tendency of the front part of the vehicle to "duck" or lunge downward when the brakes are applied, the upper and lower bushings may be mounted with their axes at somewhat of an angle to the horizontal as illustrated diagrammatically in Fig. 6. In this figure the large circle indicates the wheel 17, the small circle the spindle 20, 12 indicates the shaft of the upper bushing, and 12a the shaft of the lower bushing. With the forward direction of the vehicle as indicated by the arrow, the bushings may be mounted with their axes rearwardly converging as shown. As the rubber bushings may be made short and compact in the axial direction they are well adapted for this purpose. The converging relation of the bushings may be provided as by disposing shims between the forward trunnions 30 and the frame and between the bracket 32 and the frame.

While the rubber of the bushings has a degree of shock-absorbing ability, an auxiliary shock-absorber 44, preferably of the double-acting direct-action type, may be provided. In order that the shock-absorber may act most effectively in conjunction with the cushioning effect of the rubber bushing it is pivoted to the upper link member 27 at 45 and preferably to the lower link member 28 at 45a in a position, such as illustrated, so that it is feasible to use abruptly-acting limiting stops 46, 47 on the shock-absorber to limit the extreme deflection of the wheel at positions such as are indicated by the broken line showing of the outer link extremities in Fig. 1. If desired, additional stops, not shown, may be provided for limiting deflection of the wheel in the downward direction. Owing to the fact that the rubber of the bushings acts in series with the shock-absorber it is effective to cushion the shock occasioned by abrupt contact of the stops without straining any of the parts excessively. The arrangement is such that the vehicle body is insulated from all shock-absorber action by the rubber of the torsion bushings.

The shock-absorber 44, referring to the illustrative form shown in Fig. 4, is of the double-acting type and may comprise telescopically arranged cylindrical casings 44a and 44b and an inner chamber tube 48 in casing 44a in which an apertured and valved piston 49, moving with the outer casing 44b operates. At the bottom of the chamber tube 48 is mounted a valve mechanism 48a having communication with a fluid reservoir between the tube 48 and casing 44a, the arrangement being such that the shock-absorber is double-acting. If desired, rubber cushions 45b and 45c may be provided at the pivotal connections of the shock-absorber with the upper and lower link members.

In the embodiment of Figs. 7 to 9 only one rubber torsion bushing is provided for the wheel assembly, this bushing being mounted at the pivotal connection of the lower link member with the frame element 16. In this embodiment the direct-acting shock-absorber 44 is pivoted at its lower end to an arm 50 integral with an eye 51 enclosing the rubber bushing at its central region and the upper end of the shock-absorber is pivoted near the outer end of an upper link member 52. A lower link member 53 of wish-bone shape comprises eyes 54, 54 integral with its arms enclosing and gripping the bushing adjacent the ends of its sleeve structure 14. The arrangement is such that the lower end of the shock-absorber moves with the lower link member 53 through the sleeve structure 14—15 and shocking forces of the absorber are cushioned by the rubber 13 of the bushing. In this embodiment torsional adjustment of the bearing is provided by means of an arm 55 clamped upon the inner shaft element 12a of the bushing and having a pivoted adjusting rod 55a at its extremity, the rod being held to the frame element 16 as by nuts 53a, 53a.

The pivotal connection of the upper link 52 to the frame element 16 in this embodiment does not comprise a rubber torsion bushing, and instead may comprise an eye 56 in the end of the link member 52 in which is mounted a bearing sleeve 57 preferably cushioned by an interposed annular rubber element 58. A shaft 59 provides a pivotal connection with trunnions 30, 30 of the frame element 16. Fore and aft adjustment of the link member 52 axially of shaft 59 for varying the caster angle of the wheel may be provided by stud screws 60, 60 threadedly engaging the trunnions 30, 30 and having their inner ends bearing against the ends of the bearing sleeve 57 of the pivotal connection.

In the embodiment of Figs. 10 and 11 the mounting has a supporting rubber torsion bearing only at its upper link member 61. The shock-absorber 44 is pivoted to the upper link member 61 and lower link member 62 in a disposition similar to that of the embodiment of Fig. 1 so as to be shock-cushioned by the rubber bushing. The rubber torsion bushing is mounted with its sleeve structure 14—15 positioned within an eye 63 of the upper link member 61. The inner shaft element indicated at 64 in this embodiment, is held by clamps 65, 65 upon trunnions 66, 66 mounted upon a frame element 67. For adjusting the bushing in torsion an arm 68 is clamped upon an end portion of the inner bushing element 64 and is pivoted at its outer end to an adjusting rod 69 held, as by adjusting nuts 70, 70, to a bracket 71 upon the frame element 67. The lower link member 62 has the ends of its wish-bone arms mounted upon ends of a shaft 72. The shaft 72 is rotatable within a trunnion block 73 extending across the frame element 67 between the wish-bone arms of link member 62 and having outwardly projecting end flanges 74, 74 for attachment of the bearing block to the bottom side of the frame element 67. If desired, the shaft 72 may have a cushioned mounting within the trunnion block in a manner similar to the bearing of Fig. 9. The flanges 74, 74 are bolted to the flanges of the frame element through laterally elongated slots 75 so that the bearing block may be adjusted across the frame element to vary the position of the link element 62 in a fore and aft direction and thereby vary the caster angle of the wheel. For convenience in making this adjustment accurately the bearing block 73 is provided with an extending lug 76 the faces of which are engageable with the ends of set screws 77, 77 mounted in depending brackets 78, 78 secured to the under side of the frame element 67. Adjustment of the caster angle may be made by loosening the clamping bolts of the flanges 74, 74 of the bearing block 73, adjusting as desired by means of the set screws 77, 77 and then reclamping the bolts of the flanges 74, 74.

Variations may be made without departing from the invention as it is hereinafter claimed.

I claim:

1. A vehicle wheel mounting comprising a wheel assembly, a supported structure, means including a rubber cushioning structure connecting the wheel assembly with the supported structure, and a shock-absorber so associated with the connecting means that it acts in series with the cushioning rubber between the wheel assembly and the supported structure, the shock absorber including a limiting stop and the arrangement being such that the abrupt stopping thereof is cushioned by the cushioning rubber.

2. A vehicle wheel mounting comprising a wheel assembly, a supported structure, a linkage connecting the wheel assembly with the supported structure, at least one of the link pivots comprising a body of rubber mounted to transmit load between the wheel assembly and the supported structure by torsional stress of the rubber, and a shock-absorber connected to the linkage in such manner as to act in series with the rubber.

3. A vehicle wheel mounting comprising a wheel assembly, a supported structure, upper and lower link members pivotally connected to the wheel assembly and supported structure, the pivotal connections at the supported structure comprising rubber bushings mounted to transmit supported load by torsional stress of the rubber, and a shock-absorber connected to said link members and operable by movement thereof.

4. A mounting as defined in claim 3 in which the connection of the shock-absorber with one of the said link members is adjacent the rubber bushing of that link member.

5. A mounting as defined in claim 3 in which the shock-absorber comprises a limiting stop and the arrangement is such that the abrupt stopping thereof is cushioned by at least one of the rubber bushings.

6. A vehicle wheel mouting comprising a wheel assembly, a supported structure, upper and lower link members pivotally connecting the wheel assembly with the supported structure, at least one of the pivotal connections comprising a rubber bushing mounted to transmit supported load by torsional stress of the rubber bushing and including a mounted shaft element, and means for adjusting said shaft element in its mounting for varying the caster of the wheel.

7. A vehicle wheel mounting comprising a wheel assembly, a supported structure, upper and lower link members pivotally connecting the wheel assembly and supported structure, at least one of the pivotal connections comprising a rubber bushing mounted to transmit supported load by torsional stress of the rubber, and means for adjusting the position of the link member associated with the rubber bushing to vary the amount of caster effect of the wheel assembly.

8. A mounting as defined in claim 7 in which the rubber bushing and link member are constructed for adjustment as a unit to vary the caster angle.

9. A vehicle wheel mounting comprising a wheel assembly, a supported structure, upper and lower link members pivotally connecting the wheel assembly and supported structure, the pivotal connections at the wheel assembly permitting a steering movement of the wheel assembly about an axis, the pivotal connections at the supported structure comprising at least one rubber bushing mounted to transmit supported load by torsional stress of the rubber bushing, and means for adjusting at least one of the link members to vary the amount of caster effect of the wheel assembly.

10. A mounting as defined in claim 9 in which the rubber bushing is adjustable as to its position to vary the caster effect of the wheel assembly.

11. A vehicle wheel mounting comprising a wheel assembly, a supported structure, means including a rubber bushing connecting the wheel assembly with the supported structure in such manner that supported load is transmitted by torsional stress of the rubber bushing, and means for imparting an adjusting rotative movement to an element of the bushing to vary the relative vertical positions of the wheel assembly and supported structure while under load.

12. A vehicle front wheel mounting comprising a wheel assembly, a supported structure, upper and lower link members pivotally connecting the wheel assembly and the supported structure, the connections comprising a rubber bushing at the supported structure mounted to transmit load by torsional stress on the rubber, and means including said rubber bushing for mounting the link members for pivotal movement at the supported structure about axes extending generally in the fore and aft direction of the vehicle and in rearwardly converging relation such that upon change in vehicle motion tending to cause ducking of the front part of the supported structure a force is developed tending to counteract the tendency to duck.

13. A vehicle wheel mounting comprising a wheel assembly, a supported structure, means including a rubber bushing assembly connecting the wheel assembly with the supported structure and mounted in such manner that supported load is transmitted by torsional stress on the rubber, and means for rotating an element of the bushing assembly while maintaining the supported load on the bushing to vary the relative vertical positions of the wheel assembly and supported structure and for positively holding the bushing element in the adjusted position.

14. A vehicle wheel mounting comprising a wheel assembly, a supported structure, upper and lower link members pivotally connecting the wheel assembly and supported structure, at least one of the pivotal connections of the link members at the supported structure comprising a rubber bushing mounted to transmit supported load by torsional stress of the rubber bushing, and means for imparting an adjusting rotative movement to an element of said bushing to vary the relative vertical positions of the wheel assembly and supported structure while maintaining said supported load on the bushing.

15. A vehicle wheel mounting comprising a wheel assembly, a supported structure, a rubber bushing assembly for connecting the wheel assembly with the supported structure in such a manner that supported load is transmitted by torsional stress of the bushing, the bushing assembly comprising elements separated by the rubber and connected respectively with the wheel assembly and the supported structure, and means for imparting an adjusting movement to one of said elements to vary the relative vertical positions of the wheel assembly and supported structure while maintaining said supported load on the bushing.

16. A vehicle wheel mounting as defined in claim 15 in which the said means for imparting the adjusting movement comprises an arm on the element and means on the supported structure for moving the arm.

17. A vehicle wheel mounting comprising a wheel assembly including a brake mechanism, a supported structure, upper and lower link members pivotally connecting the wheel assembly and the supported structure, said link members being mounted at the supported structure for fore and aft swinging movement of their opposite ends, and bushings of rubber-like material in the pivotal connections of the link members at the supported structure effective to cushion said fore and aft swinging movement of the link members, the upper of said link members being shorter than the lower link member and being disposed further from the wheel axis than the lower link member, and the bushing of the upper link member being less resistant to fore and aft swinging movement than the bushing of the lower link member, the construction and arrangement of the parts being such that braking force on the wheel results in a tendency of the wheel to rotate against the resistances of said bushings through through the fore and aft swinging movements of the link members substantially without tendency of the wheel to move in translation in the fore and aft direction as a result of the braking force.

18. A vehicle wheel suspension comprising a wheel assembly, a structure supported therefrom by connecting means including an inner element, a body of rubber-like material upon said element radially outward thereof, a circumferentially discontinuous sleeve upon the said body, and means holding said sleeve and body pressed radially toward said inner element, the parts being arranged in a manner such that the supported load is sprung substantially entirely by torsional stress on the rubber-like material, adjusting means being provided for changing the position of an element or elements of said connecting means while the wheel assembly supports the load to vary the relative positions of the wheel assembly and supporting structure and for positively holding said elements in adjusted position.

ALVIN S. KROTZ.